United States Patent [19]

Eisdorfer et al.

[11] Patent Number: 5,724,411
[45] Date of Patent: Mar. 3, 1998

[54] METHOD FOR SELECTIVELY ALERTING MULTIPLE TELEPHONES OF AN INCOMING CALL

[75] Inventors: Allen Eisdorfer, Woodbridge; Jerry Eisdorfer, Somerset; Jeffrey Charles George, Warren, all of N.J.

[73] Assignee: AT&T Corp., Middletown, N.J.

[21] Appl. No.: 408,429

[22] Filed: Mar. 22, 1995

[51] Int. Cl.[6] .................................................. H04M 11/00
[52] U.S. Cl. ..................... 379/93.23; 379/211; 379/373; 379/207
[58] Field of Search ............................. 379/94, 210, 211, 379/212, 214, 217, 373, 376, 164

[56] References Cited

U.S. PATENT DOCUMENTS

| | | | |
|---|---|---|---|
| 5,040,209 | 8/1991 | Greenberg et al. | 379/94 |
| 5,206,901 | 4/1993 | Harlow et al. | 379/211 |
| 5,278,889 | 1/1994 | Papanicolaou et al. | 379/53 |
| 5,422,936 | 6/1995 | Atwell | 379/211 |
| 5,432,844 | 7/1995 | Core et al. | 379/217 |
| 5,506,890 | 4/1996 | Gupta et al. | 379/211 |
| 5,544,235 | 8/1996 | Ardon | 379/373 |

*Primary Examiner*—Stella Woo
*Attorney, Agent, or Firm*—Barry H. Freedman

[57] ABSTRACT

A method and system for selectively routing incoming calls to a requested called party wherein the requested called party is at least one of a group of individuals associated with a plurality of telephones. A database system sends a menu to a calling party so that the calling party may choose an option which corresponds to at least one individual associated with the plurality of telephones. Based on the option chosen by the calling party, the incoming call is routed to one or more destination directory numbers where the requested called party is most likely to be found. The user programmed database includes call treatment parameters corresponding to the most likely location of the requested called party at any given time. Each requested called party is associated with a distinctive alerting signal which is applied to one or more customer identified lines so that the requested called party is uniquely notified of an incoming call.

16 Claims, 6 Drawing Sheets

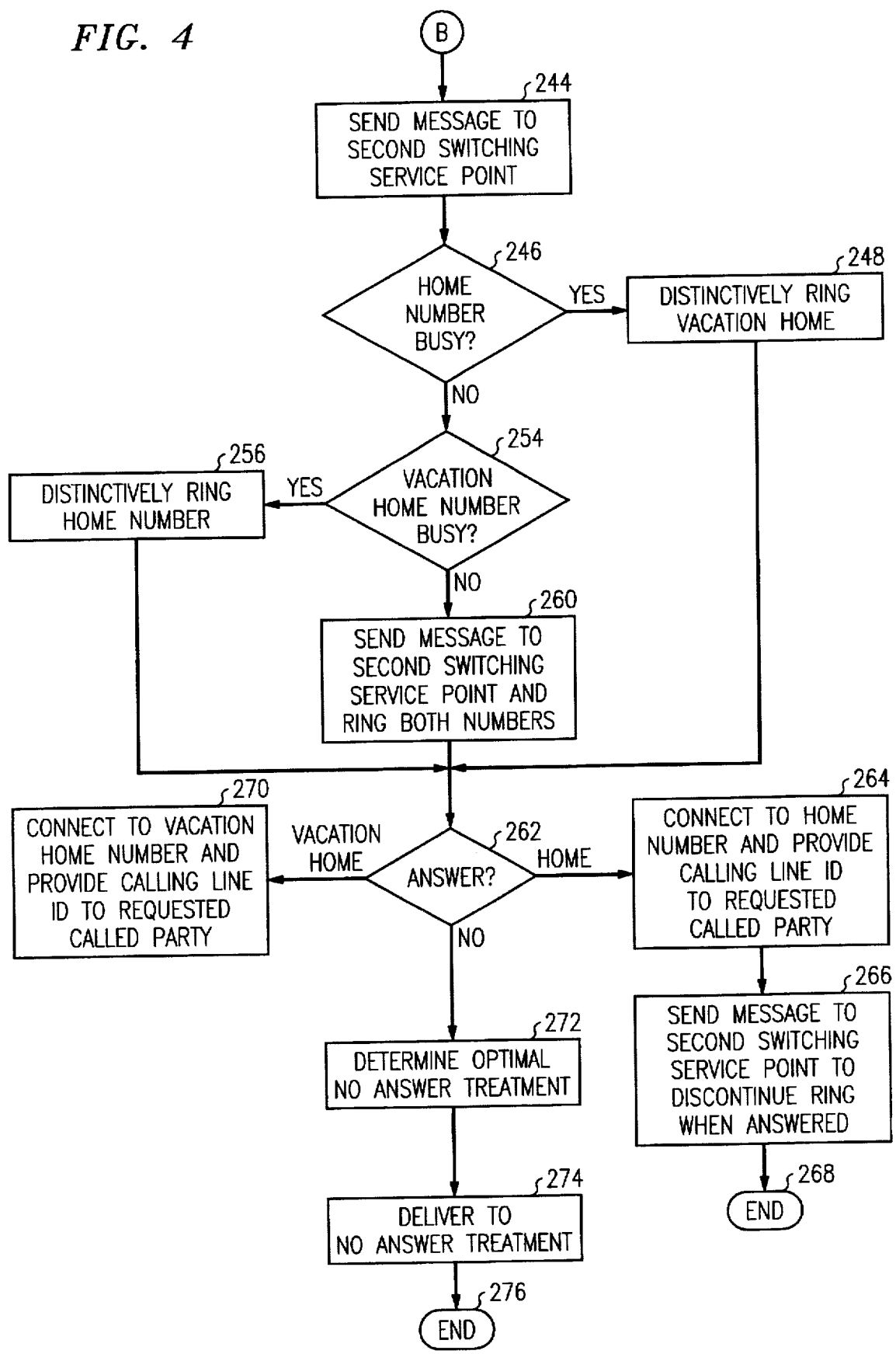

```
             MENU OPTIONS

TO REACH A SUBSCRIBER........................PRESS  1
       TO REACH   FATHER..................ENTER  A1
                  MOTHER..................ENTER  A2
                  FATHER/MOTHER.....ENTER  A12
                  CHILD 1..................ENTER  O1
                  CHILD 2..................ENTER  O2
                  DEFAULT.................ENTER  D

TO CHANGE ROUTING INSTRUCTIONS.....ENTER PASSWORD
```

*FIG. 5*

| CALL TREATMENT PARAMETERS ||||||||
| PERSON IDENTIFIER | TELEPHONE IDENTIFIER |||| ALERT TYPE | ALERT IDENTIFIER |
|  | BUSINESS | HOME | VACATION HOME | CAR |  |  |
| A1 | × | × |  | × | AT1 | SINGLE RING |
| A2 | × | × | × | × | AT2 | DOUBLE RING |
| A12 | × | × | × | × | AT3 | TRIPLE RING |
| O1 |  | × | × |  | OT1 | SINGLE BEEP |
| O2 |  | × | × |  | OT2 | DOUBLE BEEP |
| D | × | × | × | × | DT1 | TRIPLE BEEP |

*FIG. 6*

| CALL AVAILABILITY STATUS |||
|---|---|---|
| TELEPHONE IDENTIFIER | TELEPHONE NUMBER | STATUS |
| BUSINESS | (555) 949-0188 | IDLE |
| HOME | (555) 415-2219 | BUSY |
| VACATION HOME | (555) 974-9583 | IDLE |
| CAR | (555) 999-8227 | CONNECTED |

*FIG. 7*

METHOD FOR SELECTIVELY ALERTING MULTIPLE TELEPHONES OF AN INCOMING CALL

FIELD OF THE INVENTION

This invention relates to the field of local telephone switching systems, and, more particularly, to distinctively alerting an individual or group of individuals associated with a plurality of telephones of an incoming telephone call.

BACKGROUND OF THE INVENTION

Over the years, telephone service has evolved from a convenience to a necessity. One by-product of this evolution is an increase in the number of telephone users (and uses) and hence, an increase in the number of telephones. In the past, users were accustomed to a "one-to-one" relationship with the telephone. In other words, a single telephone user, such as the head of a household or business owner, was associated with a single telephone. If a calling party wanted to reach that telephone user, the party would simply dial the telephone number (i.e., directory number) associated with the user. As telephone use became more wide spread, more people became associated with a single telephone. It is very common for an entire family (consisting of, for example, two adults and two children) to be associated with a single telephone number. The problem with the "many-to-one" (many users associated with one telephone) situation is that all the users associated with the single telephone are alerted with each incoming call even if the calling party only wants to speak with one particular person. This "many-to-one" problem was alleviated with the advent of features such as caller ID which identifies the calling party, distinctive ringing which allows a single telephone to emit a plurality of distinctive rings, each ring alerting a particular individual, and terminating line ID in which a distinctive telephone number associated with a particular individual is displayed with each incoming call.

Another common circumstance of modern day telecommunications is a single user associated with many telephones (i.e., the "one-to-many" scenario). Being accessible has become a necessity for so many people, such as doctors, business executives, etc., that the overwhelming need to be "in touch" has been satisfied by a plurality of telephones. For example, it is not unusual for an individual to have a telephone for business, a telephone for home, a telephone for a vacation home, a mobile cellular phone for the car, and/or a phone that can be carried around when one is not near one of the other telephones. Since all of these telephones generally have different telephone numbers and are frequently served by different local offices with different prefixes, a calling party must know, or be able to look up, multiple telephone numbers and must frequently make multiple telephone calls to reach the called party. The "one-to-many" problem was ameliorated by an arrangement disclosed in the commonly assigned U.S. Pat. No. 5,206,901 to John B. Harlow et al. entitled "Method and Apparatus for Alerting Multiple Telephones for an Incoming Call" which issued Apr. 27, 1993 (herein "Harlow"). Harlow teaches a system in which an incoming call is routed to a destination directory number of a local switch. The switch translates the directory number into one or more identified lines served by the local switch and/or one or more directory numbers served by other switches. In Harlow, an intelligent network simultaneously alerts multiple phone lines and terminates an incoming call to the line from which an answer is first detected. Thus, the need for a calling party to memorize multiple telephone numbers to reach a particular person was eliminated.

Harlow significantly improved the state of the prior art and made it much easier for a telephone user associated with multiple telephones to "be in touch". Harlow did not, however, solve the problem of yet another common situation in modern telecommunications: the "many-to-many" scenario in which there are multiple users associated with multiple telephones. The "many-to-many" problem presents complex routing considerations because certain users may be available only at certain telephone locations. Take, as an example, a family consisting of a father, a mother and two children, wherein this family has a plurality of telephones including a telephone for business, a telephone for home, a telephone for a vacation home and a mobile cellular telephone for the car. Although the mother may wish to receive telephone calls at all four telephone locations, the father may never want to receive calls at the vacation home. On the other hand, the children may never be reached at the business or in the car. If a calling party wishes to speak only to the father of the family, he or she must know the telephone number and location of the father at the time that the call is placed. Even knowing his whereabouts and telephone number, however, will not guarantee that one of the other family members will not answer the call.

Although Harlow teaches alerting some or all of the telephones associated with a telephone user when there is an incoming call, in some instances, indiscriminate alerting of all telephones is inappropriate. For example, it may be inappropriate to alert a vacation home telephone of an incoming business call when the occupants of the vacation home do not want to receive business calls. Indeed, according to the above example, if the calling party wishes to speak only to the father, there is no need to alert the vacation home telephone because he does not wish to receive calls there. Although telecommunications has evolved significantly, the inconveniences associated with the "many-to-many" circumstance remain. Therefore, a problem in the art is locating and identifying a specific individual for delivery of a telephone call when that individual is one of a plurality of persons associated with a plurality of telephones.

SUMMARY OF THE INVENTION

This problem is solved and a technical advance is achieved in the art by a method and system that selectively routes incoming calls to one or more user designated lines served by a single local switch or one or more directory numbers served by multiple local switches in accordance with a user programmed database and distinctive alerting. The user programmed database allows multiple users associated with a plurality of telephones to be distinctively alerted of an incoming call at pre-selected locations. A calling party who wishes to speak to a particular called party chooses an option from a menu. The option chosen by the caller corresponds to a requested called party. Based on input parameters established by the users, such as telephone identification numbers and time of day, an incoming call for a requested called party can be optimally routed to locations where the requested party is most likely to be found. Other features include distinctive ringing and caller identification so that the called party may be distinctively alerted that an incoming call is for him or her, or can ascertain the identity of the caller.

In a preferred embodiment of the method of the present invention, an incoming call is received at a local switch via the called directory number. The directory number categorizes the incoming call as one which requires special treatment. In this case, special treatment comprises receiving instructions from a database shared by a plurality of local switching systems. Advantageously, the database prompts the calling party with menu options which correspond to the multiple users associated with the directory number. The calling party may choose to speak to one (or more) users on the menu or may opt for a default selection which indicates that he or she is willing to speak to anyone associated with the directory number. Based on the requested called party, the database determines the call treatment of the incoming call.

More particularly, the database determines which customer line(s) must be alerted and which particular alert type must be used to alert the requested called party of the incoming call. After the database determines the call treatment, one or more customer line identifications associated with the requested called party are returned to the switch. The switch determines availability status (i.e., busy/idle) of each identified customer line. A determination is made as to the optimal routing of the incoming call and the incoming call is delivered to each available line. Upon delivery, if an answer is detected at any one of the plurality of telephones, the call is terminated to the answered telephone. If no answer is detected, the database determines the optimal no-answer treatment. No-answer treatment may include forwarding the incoming call to voice mail, an answering service or a line associated with an answering machine.

In a preferred embodiment of the system, an intelligent network comprising a plurality of switching service points interconnected by a plurality of communication links via a signal transfer point. The database is connected to the signal transfer point, such that when a call is received at one of the switching service points, the switching service point recognizes the directory number as a special treatment number requiring database action and connects the calling party to the database. The database prompts the calling party to select a called party or a default option from the menu.

Based upon the requested called party, the database returns routing numbers to the switching service point for translation. The routing numbers identify the telephones at which a particular end user(s) may be found. The database also determines which one of a plurality of distinctive alerting signals corresponds to the specific end user requested by the calling party. The distinctive alert is sent to the appropriate telephones to signify an incoming call for a particular called party. The identity of the calling party may also be communicated, for example, by sending the incoming calling line identification (ICLID) of the calling party to the called party.

The local switch receiving the incoming call sends messages over the signaling channel to the local switching systems identified by the database requesting the status (i.e., busy/idle) of the lines associated with the requested called party. The identified local switching systems return the requested status information, and request that distinctive alerting be applied to the lines associated with the directory numbers which are available (idle) to receive calls. An idle line is a customer identified line in a state to receive incoming calls. For cellular telephones or video phones, the term "idle" is synonomous with "connected". An idle state may also mean that the line is busy but it has a call waiting feature which allows the line to be alerted. For the purposes of clarity, the use of the term "idle" hereinafter inherently includes "connected" or "busy, but able to be alerted". When one of the idle lines answers by going off-hook, it is reported to the local switching system and the incoming call is routed over a trunk to the local switching system that reported the off-hook signal. The calls to the other lines are dropped.

BRIEF DESCRIPTION OF THE DRAWINGS

A more complete understanding of the invention may be obtained from a consideration of the following description in conjunction with the drawings, in which:

FIGS. 2–4 are flow diagrams of the method steps of control of the actions at a switching service point in an exemplary embodiment of the intelligent network of the present invention as shown in FIG. 1;

FIG. 5 is a table which shows the menu options available to a calling party in an exemplary embodiment of the intelligent network of the present invention;

FIG. 6 is a table showing the call treatment parameters of an exemplary embodiment of the intelligent network of the present invention; and FIG. 7 is a call availability status table of an exemplary embodiment of the intelligent network of the present invention.

DETAILED DESCRIPTION

Figure 1:
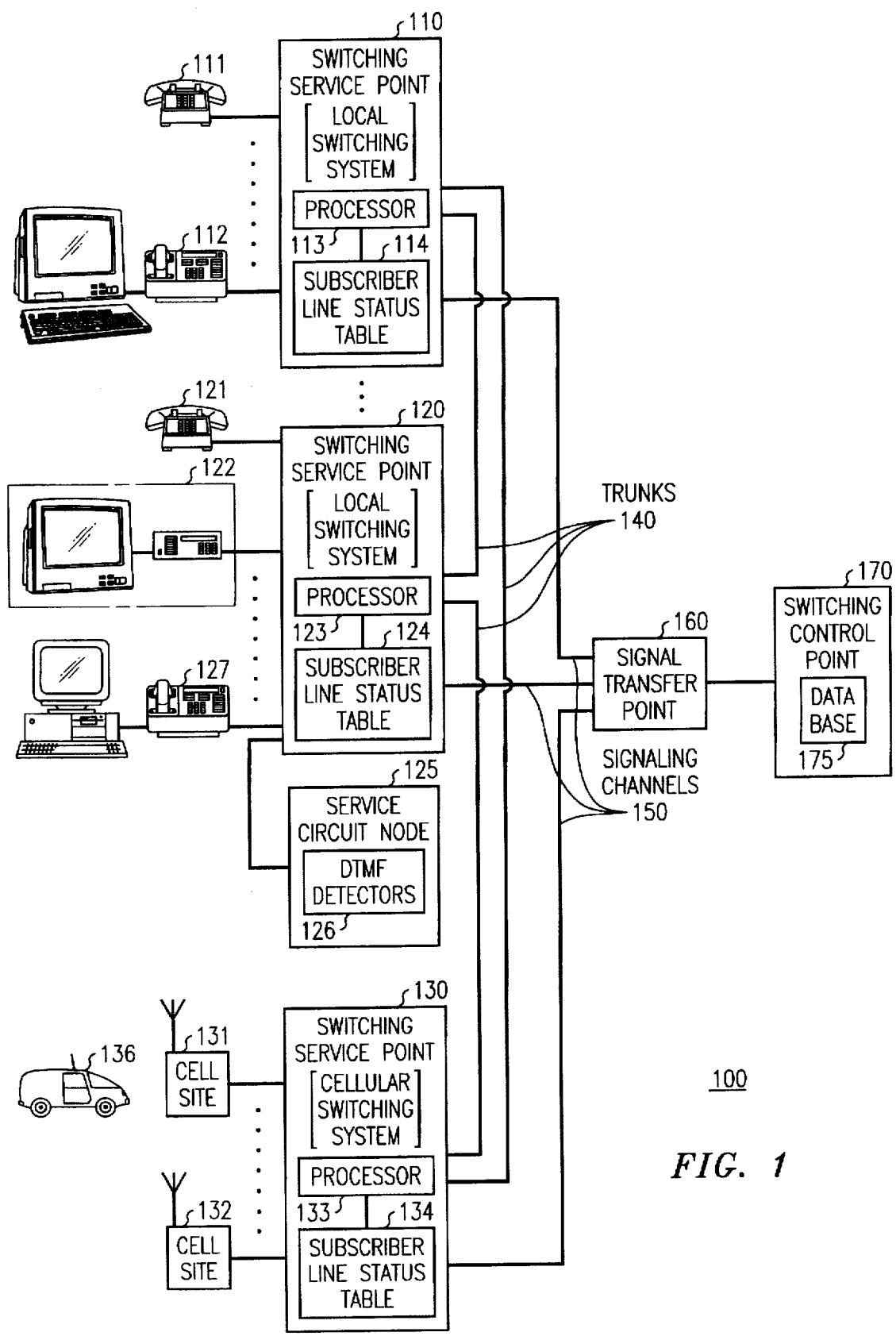
FIG. 1 is a block diagram of a switching network configuration including an exemplary embodiment of the intelligent network of the present invention.

FIG. 1 shows a simplified block diagram of a telecommunications system 100, wherein the exemplary method of this invention may be practiced. In this embodiment, telecommunications system 100 is an intelligent network, similar or identical to the intelligent network described in *AT&T Technical Journal*, Summer, 1991, pages 11–25, which is incorporated herein by reference. Intelligent network 100 comprises, in this embodiment, a plurality of switching service points (SSPs) 110, 120 and 130. Three SSPs are shown in this example for clarity, but an operational intelligent network may comprise more SSPs.

SSP 110 is a distributed control, local digital switch, such as a 5ESS® switch as described in the *AT&T Technical Journal*, V. 64, No. 6, July–August 1985, pages 1303–1564, the November, 1981 *Bell Laboratories Record*, page 258, and the December, 1981 *Bell Laboratories Record*, page 290 and manufactured by AT&T. Alternatively, SSP 110 may be a distributed control, analog or digital switch, such as an ISDN switching system as disclosed in U.S. Pat. No. 4,592,048, issued to M. W. Beckner et at., on May 27, 1986. SSP 110 is connected to a plurality of telephone station sets via customer-identified lines, such as dual-tone, multifrequency (DTMF) telephone 111 and integrated services digital network (ISDN) telephone 112. ISDN telephone 112 may be connected to a personal computer, as is known in the art. SSP 110 is a stored program controlled system, under control of processor 113. Processor 113 maintains a subscriber line status table 114 of the on-hook, off-hook, or other state of all of the telephone station sets (such as 111, 112) connected to SSP 110.

SSP 120 comprises, in this exemplary embodiment, a 5ESS® local switch, similar or identical to SSP 110. A plurality of telephone station sets are connected to SSP 120 including DTMF telephone 121, video phone 122 and ISDN telephone 127. An exemplary embodiment of a video telephony system is described in U.S. Pat. No. 5,278,889 issued to A. C. Papanicolau on Jan. 11, 1994. SSP 120 is controlled by processor 123 which maintains a subscriber line status table 124. SSP 120 is also connected to a service circuit node (SCN) 125 which provides centralized services for SSP 120 and other SSPs in intelligent network 100. SCN 125 includes DTMF detectors 126.

SSP 130 comprises a cellular communications system, such as an AT&T Autoplex® System 1000. Cellular communications systems comprise a plurality of cell sites, for example, 131, 132 connected to a wireless communication system 130 via data links for message communication and communication path trunks. Wireless communication system 130 may be a central processing system, or may be a distributed processing system as described in Warty et at., U.S. Pat. No. 4,827,299, issued May 2, 1989 to AT&T. Wireless communication system 130 includes a processor 133 and a status table 134 which records the status of mobile stations, such as mobile station 136, within the cellular communications system.

SSPs 110, 120, and 130 are interconnected by a plurality of trunks or channels 140 which provide voice, data and video communication paths between SSPs. SSPs 110, 120, and 130 are also interconnected by signaling channel 150. SSPs use signaling channels 150 to communicate with each other in setting up connections and providing special features. SSPs communicate on signaling channels 150 using Signaling System 7 (SS7) protocol in this exemplary embodiment, as is known in the art. Signaling channels 150 are connected to signal transfer point 160 (STP), which acts as a signaling switch to receive and forward messages among SSPs, and receives and forwards signaling as necessary to a switching control point 170 (SCP). SCP 170 provides a common database 175 for use by all of the SSPs.

Take, as an example of the embodiment of this invention, a calling party at telephone 111 who wishes to speak to a child in a family which subscribes to the feature of the present invention. This particular subscriber family has a home telephone 112, a vacation home telephone 121, a business telephone 127 and a mobile cellular phone 136. The calling party at telephone 111 dials a special directory number. In this embodiment, all switches whether part of the intelligent network or not, recognize during translation the special directory number as requiring special call treatment, similar to current treatment of "800" and "900" calls. If the calling party were served by a non-SSP switch, that non-SSP switch would route the call to an SSP, such as SSP 110. The actions of SSP 110 are identical whether the call originated on SSP 110 or was preliminarily routed to SSP 110. SSP 110 recognizes the special directory number during translation and sends a message on signaling channel 150 through STP 160 to SCP 170 requesting database instructions. SCP 170 performs a lookup in database 175 and returns a menu to the calling party at telephone 111. In this case, the calling party at telephone 111 chooses the menu option which corresponds to a particular child (e.g., the calling party chooses option O1 as described below in FIG. 5) in the subscriber family. Recognizing the option chosen by the caller, database 175 returns to SSP 110 all destination directory telephone numbers at which the requested called party (i.e., the child) is most likely to be found.

SSP 110 then determines the busy/idle status of destination directory numbers received from the database. If all of the received destination directory numbers are connected to SSP 110, SSP 110 checks subscriber line status table 114 for the busy/idle status of each line in accordance with database instructions. If the lines are idle, a distinctive alert signal (as received from the database) is applied to the appropriate destination directory numbers so that the child may recognize the incoming call as being for him or her.

If the subscriber family has telephones on different local switching systems, SSP 110 queries other SSPs for the busy/idle status of the received destination directory numbers using ISDN user part (ISUP) messages. In the above example, the child may only be reached at the home telephone or the vacation telephone (see calling parameters described below in FIG. 6). Thus, SSP 110 sends ISUP messages to SSP 120 because the vacation home telephone 121 is connected to SSP 120 while the home telephone 112 is served by SSP 110. SSP 110 and SSP 120 perform table lookups in their subscriber line status tables 114 and 124, respectively, and determine whether the lines corresponding to the requested destination directory numbers are busy or idle. SSP 120 returns the busy/idle status via signaling network 150 to SSP 110. If all requested destination directory numbers are idle, SSP 110 causes SSP 120 to apply a distinctive alert signal (corresponding to the child) to the requested destination directory numbers by sending another ISUP message.

If the requested destination directory numbers are on the same central office switch, such as SSP 110, SSP 110 checks for answered supervision. For subscribers who have telephone numbers on different central office switches, as is the case in this example, SSP 110 checks for an ISUP answer message from either SSP 120 or SSP 130. When an answer message is received, SSP 110 routes the call via minks 140 to the SSP that sent the answer message. SSP 110 sends an ISUP message to the other SSP to discontinue ringing. Finally, SSP 110 updates automatic message accounting records to indicate that the call received a multiple ringing treatment.

Figure 2:
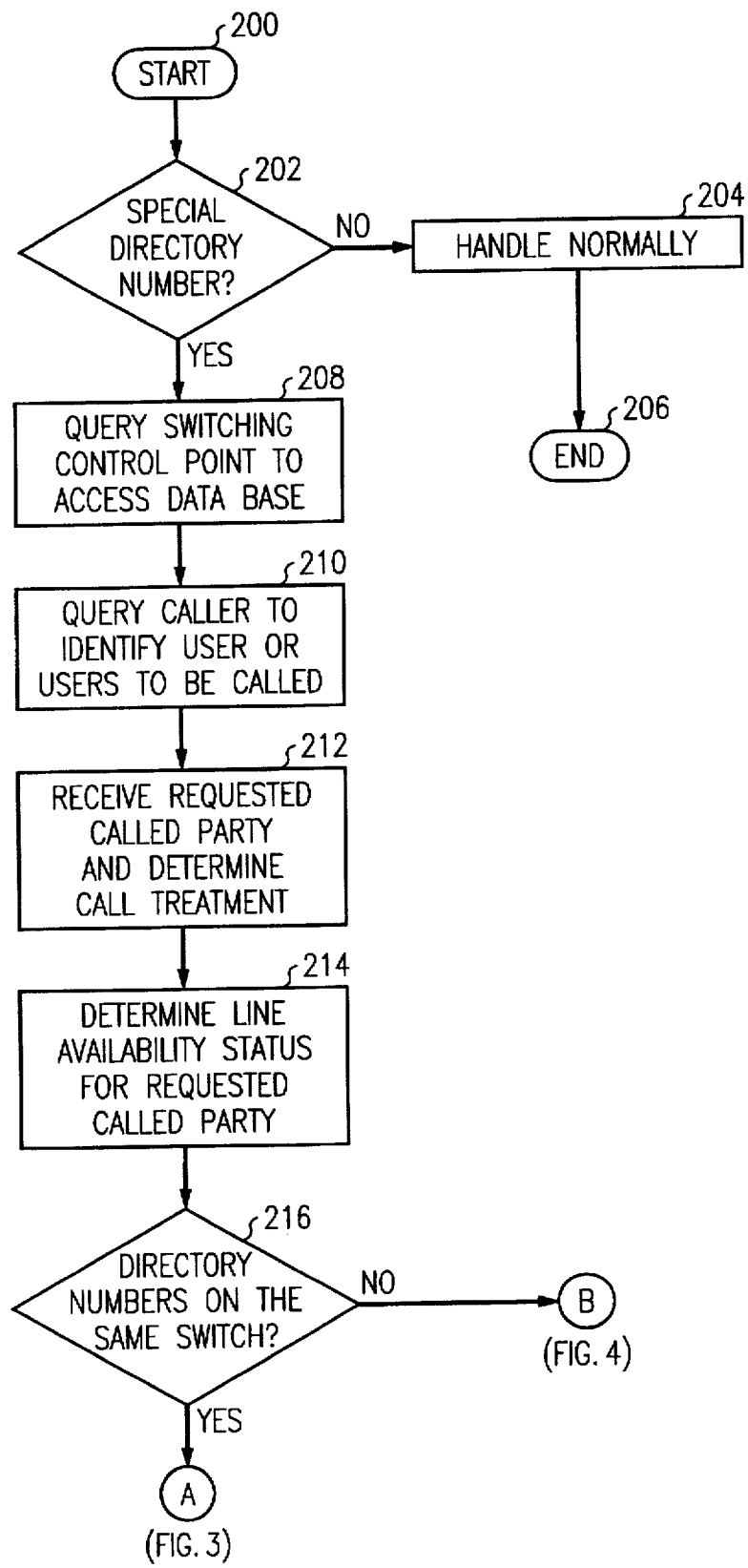

FIG. 2 is a flow diagram describing the actions taken in telecommunications system 100 in accordance with the method of the present invention. For clarity, the above example of a person at telephone 111 who wishes to speak to a child of a family which subscribes to the feature of this invention is continued. The child may only be reached at the home directory number or vacation home directory number (see FIG. 6).

The example starts in block 200 when an incoming call from telephone 111 is received and proceeds to decision diamond 202 where it is determined whether the directory number of the incoming call is one that requires "special treatment". In this case, special treatment comprises receiving instructions from a database. If the call does not receive special treatment, the call is handled normally in box 204 and this branch ends in circle 206.

If in decision diamond 202 it was determined that the call does receive special treatment, then in box 208 a query is sent to the SCP to access the database. Processing continues to box 210 where a message is received back from the SCP and a menu is presented to the calling party at telephone 111 so that the caller may choose a called party. The menu includes options which correspond to members of the family which subscribe to the feature of this invention. The menu, which is described in greater detail in FIG. 5 below, can be in visual form (for example, if the caller is using an ISDN phone connected to a computer) or it may be an announcement using known speech technology techniques, such as those described in commonly assigned U.S. Pat. No. 5,007,076 issued to J. R. Blakley on Apr. 9, 1991 and the patents cited therein.

After the caller chooses an option on the menu, e.g., the caller chooses child 01 of the subscriber family (see FIG. 5), the process continues to block 212 where the database receives the requested called party and determines call treatment of the incoming call, call treatment parameters having been previously programmed by the subscriber of the feature. The message from the database identifies which destination directory number locations (e.g., home, vacation home, business, etc.) a particular called party may be reached. An example of a populated user programmed call parameter table is shown in detail in FIG. 6.

Processing continues to box 214 where the line availability status of each requested destination directory number is determined. The line availability refers to the busy/idle status of the telephone associated with the requested destination directory number. An example of a call availability status table is shown in detail in FIG. 7 and described in detail below.

Processing continues to decision diamond 216 where it is determined whether the requested destination directory numbers are on the same switch. If the destination directory numbers are on the same switch, processing continues through connector A (see FIG. 3). If the destination directory numbers are on separate switches, processing continues through connector B (see FIG. 4). In this example, the calling party wishes to reach child (O1) of the subscriber family who, according to the call treatment parameters shown in FIG. 6, is only able to receive calls at the home directory number (telephone 112) or the vacation home directory number (telephone 121). As shown in FIG. 1, the home telephone and the vacation home telephone are served by different central office switches.

Figure 3:
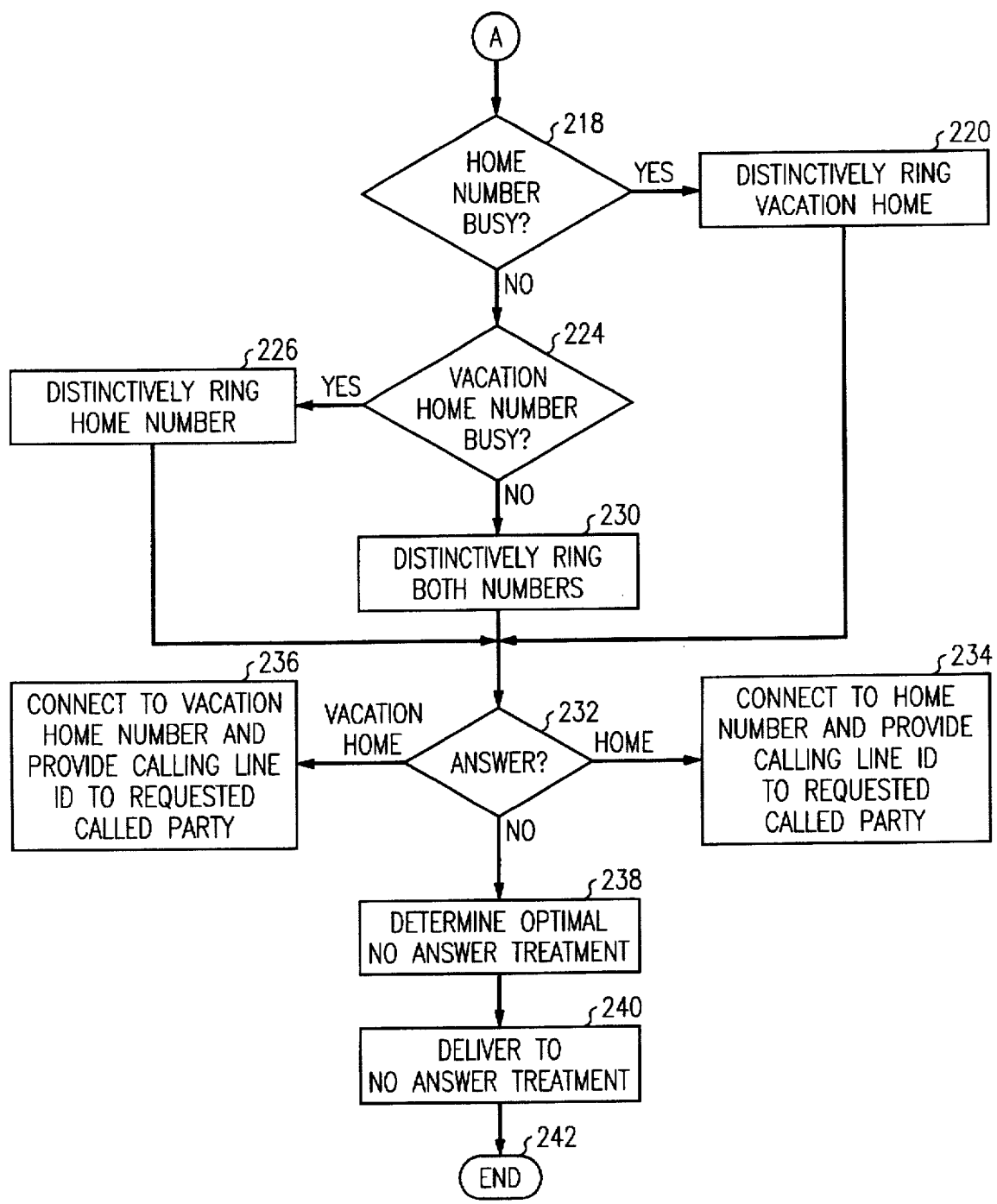

However, if the requested destination directory numbers are on the same central office switch, such as SSP 110, the process continues in decision diamond 218 of FIG. 3 where it is determined whether the home directory number is busy. If the home directory number is busy, the call distinctively rings the vacation home directory number in box 220. If it is determined in decision diamond 218 that the home number is not busy, a determination as to whether the vacation home number is busy is made in decision diamond 224. If the vacation home number is busy, the switch distinctively rings the home number in box 226 so that the requested called party is notified of the incoming call.

If in decision diamond 224 it is determined that the vacation home number is not busy, then in box 230 the switch distinctively rings the requested called party at both the home number and the vacation home number. The process continues in decision diamond 232 to determine whether answer is detected. If answer is detected on the home directory number, the incoming call is connected to the home number in box 234. Alternatively, if answer is detected on the vacation home directory number, the incoming call is connected to the vacation home in box 236 and the identity of the caller is provided to the requested called party. If no answer is detected in response to ringing in box 220, 226 or 230 after a pre-determined time, the process continues to box 238 where the optimal "no-answer" treatment is determined. No-answer treatment may comprise forwarding the call to an answering service, voice mail or a line associated with an answering machine or continued ringing. In box 240 the incoming call is delivered to the optimal no-answer treatment and this branch ends in circle 242.

If, as is the case in this example, the requested destination directory numbers are not on the same switch, the process continues in FIG. 4, box 244 where the database sends a message to the second switching service point. In decision diamond 246, a determination is made as to whether the home number is busy. If the home number is busy, the incoming call is routed to the vacation home telephone in box 248. If it is determined, in decision diamond 246, that the home number is not busy, the process continues to decision diamond 254 to determine whether the vacation home phone is busy. If the vacation home phone is busy, the process continues to box 256 where distinctive ringing is applied at the home phone. If in decision diamond 254 it is determined that the vacation home phone is not busy, then the process continues to box 260 where a message is sent to the second switching service point so that the distinctive ring associated with the requested called party can be applied at both the home phone and the vacation home phone.

In decision diamond 262, a determination is made as to whether answer is detected. If answer is detected at the home number, the incoming call is connected to the home number and the caller's identity is provided to the requested called party in box 264, a message is sent to the second switching service point to discontinue ringing the line in box 266. On the other hand, if answer is detected at the vacation home at decision diamond 262, the process continues to box 270 where the incoming call is connected to the vacation home number and the caller ID is provided to the requested called party. If no answer is detected in response to ringing box 248, 256 or 260, the process continues to box 272 where the optimal no-answer treatment is determined. The incoming call is delivered to the optimal no-answer treatment in box 274.

FIG. 5 shows an exemplary embodiment of the menu options presented to the caller at telephone 111. Continue with the above example of a subscriber family consisting of a father, a mother and two children. A caller who dials the special directory number is presented with two options. The first option allows the caller to reach a subscriber by entering the number "1" on a user interface to telecommunications system 100. The caller could also elect menu options using speech technology, as is known in the art. If the caller is a subscriber to the feature of the invention, a second option allows the subscriber to program call parameters in the database by entering a password.

As shown in FIG. 5, to reach the father of the subscriber family, the calling party enters the code "A1". To reach the mother of the subscriber family, the code "A2" is entered. An option which allows the calling party to reach either the mother or the father of the family corresponds to code "A12". To reach a child of the subscriber family, the calling party enters the code O1 or O2. A default selection, code D, indicates that the caller is willing to speak to any one of the members of the subscriber family. If a menu selection is not entered after a predetermined time period, the menu system will select the default.

FIG. 6 shows an example of call treatment parameters established by the subscriber family described above. The person identifiers (A1, A2, A12, O1, O2 and D) correspond to the codes associated with each member of the subscriber family as described above and shown in the menu options of FIG. 5. The telephone identifier denotes each telephone location of the subscriber family. This subscriber family has four telephones: a business telephone, a home telephone, a vacation home telephone and a mobile cellular car phone. The database stores a unique alert type which corresponds to each member of the subscriber family so that it may provide a specific alert identifier to the local switch. The alert identifier is the distinctive alert signal assigned to each member of a subscriber family so that the member is singularly notified of an incoming call. For example, child 1 (O1) of this subscriber family is assigned alert type OT1 and is notified of an incoming call by a single beep signal. The alert identifier may also be in visual form such as a textual display or a visible icon which appears on a screen, such as in the case of a video phone.

The call treatment parameters established in FIG. 6 indicate that the father (A1) is willing to receive calls at the business telephone, home telephone and mobile car telephone. The father knows that incoming calls are directed to him when he hears a single ring alert signal. The mother (A2) of the family can be reached at all of the telephones associated with this subscriber family. She is notified of an incoming call by a distinctive double ring alert signal. If a calling party chooses the default selection, the incoming call is routing to each telephone associated with this subscriber family. The subscriber family recognizes that the caller is willing to speak to any one of the members of the family by an alert identifier characterized by a triple beep signal.

Call treatment parameters may be continually updated by the subscriber family to reflect schedule changes. For example, if the entire family is on vacation, all incoming calls could be routed to the vacation home telephone for a period of time. In an exemplary embodiment of the present invention, call treatment parameters to accommodate the individual needs of each subscriber family member can be programmed into the database via a menu similar to the menu options provided to the caller (see FIG. 5), speaker-dependent speech technology or any other form of interactive user interface.

FIG. 7 shows the current call availability status of each of the telephones associated with this subscriber family. The call availability status table shown in FIG. 7 embodies information received by the database. The table includes the telephone identifier which indicates the location of the telephone, the telephone number which indicates the directory number of the telephone at a given location, and status of each telephone associated with this subscriber family. As shown in the table, the business phone, vacation home telephone and car phone are all in an idle state and thus, can receive incoming calls. The home telephone, identified by telephone number (555) 415-2219 is currently in a busy state. Thus, unless that telephone number subscribes to caller waiting, an incoming call for the mother of the subscriber family, which would normally be routed to all of the telephones associated with the subscriber family, will not be routed to the busy home telephone at this time. Therefore, an optimal routing instruction for the incoming call, at this instant, is to send the call to the switches associated with the business telephone, vacation home telephone and mobile cellular car phone only.

The method and system of the present invention achieves advantages over the prior art in that a specific individual who shares a plurality of telephones with other users can provide information to an intelligent network such that the individual may be located and uniquely identified for delivery of a telephone call. It is to be understood that the above-described embodiments are for illustrative purposes only and that numerous other arrangements of the invention may be devised by one skilled in the art without departing from the spirit or scope of the invention.

The invention claimed is:

1. A method for selectively routing incoming calls to a requested called party, wherein the requested called party is at least one of a group of individuals associated with a plurality of telephones, the method comprising:

receiving an incoming call to a special directory number associated with each individual and each one of the plurality of telephones at a local switching system;

responsive to receiving the incoming call, querying a caller to choose a requested called party from among the group of individuals associated with the special directory number;

based on the chosen called party, translating the special directory number of the incoming call into one or more previously stored destination directory numbers, wherein the one or more destination directory numbers are determined by user-established calling parameters;

obtaining from a database a distinctive alert identifier corresponding to at least one of the group of individuals associated with the special directory number;

distinctively alerting one or more destination directory numbers in accordance with the alert identifier obtained from the database; and terminating the incoming call to one of the plurality of telephones from which an answer is detected.

2. The method of claim 1 wherein querying the caller to choose a requested party comprises presenting the caller with a menu including options which correspond to each individual associated with the special directory number of the incoming call.

3. The method of claim 1 wherein the translating step comprises translating the special directory number of the incoming call into one or more previously stored destination directory numbers served by the local switching system and one or more previously stored destination directory numbers not served by the local switching system.

4. The method of claim 3 wherein translating the special directory number of the incoming call comprises:

determining which local switching system serves an identified customer line associated with the special directory number; and routing the incoming call to an identified idle customer line.

5. The method of claim 1 and further comprising providing the identity of the caller to the requested called party.

6. The method of claim 1 and further comprising delivering the incoming call to no-answer treatment if answer is not detected.

7. A method for selectively routing incoming calls to a requested called party, wherein the requested called party is at least one of a group of telephone users associated with a plurality of telephones, the method comprising:

receiving an incoming call comprising a special directory number associated with each of the telephone users using the plurality of telephones at a switching service point;

the switching service point querying a database shared by a plurality of switching service points;

the database querying the caller to choose a requested called party;

responsive to the requested called party chosen by the caller, the database sending the switching service point at least one destination directory number corresponding to a telephone location where the requested called party is most likely to be found;

the switching service point initiating the call to the destination directory number;

obtaining from the database an alert identifier associated with the requested called party;

distinctively alerting one or more at least one destination directory numbers with the alert identifier associated with the requested called party; and terminating the incoming call to the destination directory number from which answer is first detected.

8. The method of claim 7 wherein querying the caller to choose the requested called party comprises presenting the caller with a menu including options which correspond to each user associated with the special directory number of the incoming call.

9. The method of claim 7 and further comprising delivering the incoming call to a no-answer treatment if answer is not detected after a pre-determined period of time.

10. The method of claim 9 wherein delivering the incoming call to a no-answer treatment comprises routing the incoming call to a voice mail service.

11. The method of claim 9 wherein delivering the incoming call to a no-answer treatment comprises routing the incoming call to a customer-identified line associated with an answering machine.

12. The method of claim 9 wherein delivering the incoming call to a no-answer treatment comprises routing the incoming call to an answering service.

13. The method of claim 7 wherein initiating calls to the at least one destination directory number comprises determining call availability status of the at least one destination directory number.

14. The method of claim 7 and further comprising the switching service point initiating calls to the at least one destination directory number wherein at least one destination directory number is associated with a telephone connected to another switching service point.

15. In a telecommunications network, a system for selectively routing incoming calls to a requested called party, wherein the requested called party is at least one of a group of individuals associated with a plurality of telephones, the system comprising:

means for receiving at a switching service point an incoming call comprising a special directory number associated with the group of individuals and the plurality of telephones;

means for querying a database shared by a plurality of switching service points;

means for prompting a caller to choose a requested called party;

responsive to the requested called party chosen by the caller, means for sending the switching service point at least one destination directory number corresponding to one of the plurality of telephones;

means for obtaining from the database an alert identifier associated with the requested called party;

means for initiating the call to the at least one destination directory number;

means for distinctively alerting the at least one destination directory number;

means for determining a first of one or more identified lines associated with the at least one destination directory number from which answer is detected; and means for terminating the incoming call to the first of one or more identified lines responsive to the determining means.

16. The system in accordance with claim 15 further comprising means for delivering the incoming call to a no-answer treatment if answer is not detected from any of the one or more identified lines.

* * * * *